May 26, 1970                     B. H. KLYCE                    3,514,617
              VIBRATING FIBER OPTIC DEVICE FOR SENSING
                   ANGULAR DISPLACEMENT OF A SHAFT
                        Filed April 11, 1968
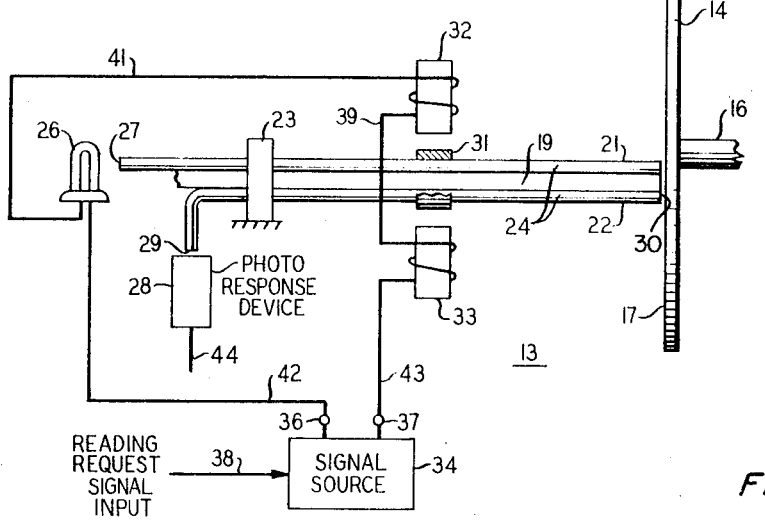
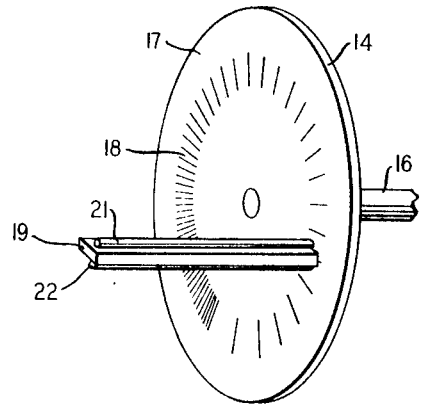
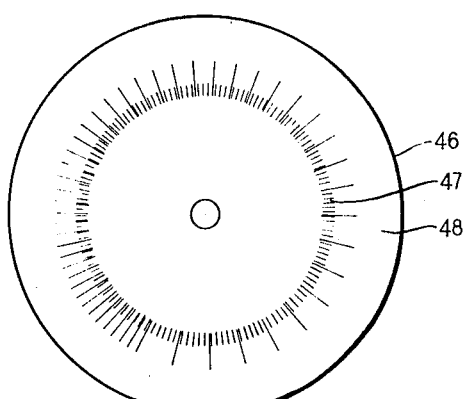
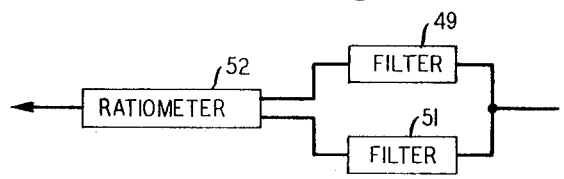
INVENTOR
B. H. KLYCE
BY
ATTORNEY

United States Patent Office 3,514,617
Patented May 26, 1970

3,514,617
VIBRATING FIBER OPTIC DEVICE FOR SENSING ANGULAR DISPLACEMENT OF A SHAFT
Battle H. Klyce, Sea Bright, N.J., assignor to Bell Telephone Laboratories, Incorporated, Murray Hill, N.J., a corporation of New York
Filed Apr. 11, 1968, Ser. No. 720,584
Int. Cl. G02b 5/14
U.S. Cl. 250—227                                    7 Claims

ABSTRACT OF THE DISCLOSURE

An angular position to frequency transducer suited for remote utility meter reading systems is described. The transducer utilizes cantilevered light pipes to scan an optically coded disc. A light source mounted adjacent one of said light pipes illuminates the disc. A photoresponsive device mounted adjacent a second of the light pipes provides a signal dependent upon illumination reflected by the disc.

FIELD OF THE INVENTION

This invention relates to a system for reading utility meters from a central location by means of a telephone circuit and particularly to an improved optical transducer for providing a signal indicative of a meter reading.

BACKGROUND OF THE ART

The desire to read utility meters automatically over a telephone network and to report the readings to a central data collection center has existed for many years. In a few isolated cases remote reading of meters is an accomplished fact. An economical system suitable for widespread residential use, however, has thus far eluded the industry.

To be commercially acceptable, an automated residential utility meter reading system should employ a minimum of equipment at each meter location. The transducer for converting the meter reading to electrical signals should minimize frictional drag on the meter movement. To further reduce cost, especially the cost of initially installing such a system, the bulk of existing utility meters should be integrated into the systems.

BRIEF DESCRIPTION OF THE INVENTION

The present invention includes a plate having first and second sets of alternately arranged areas of first and second optical characteristics distributed along a path. The plate is mounted on a pointer shaft of a utility meter. A rigid member including a first light pipe is mounted for oscillatory motion with its first surface adjacent the path. A light source is mounted to illuminate the areas of the first and second optical characteristics. A photoresponsive device is mounted adjacent the light pipe to provide a signal having a frequency characteristic of the angular position of the plate when the rigid member is oscillated.

In one embodiment, the rigid member includes a second light pipe. The light source is mounted adjacent the second light pipe so that the light from the source is transmitted by the oscillated rigid member to illuminate the areas of first and second optical characteristics.

In one embodiment, the rigid member is held so that the portion adjacent the plate provides a cantilevered portion. The outer surface of the rigid member includes magnetic material. A pair of electromagnets are mounted on oppositely disposed sides of the rigid member for causing the cantilevered portion to vibrate upon application of a signal.

In a further embodiment, a second set of areas having the first optical characteristic are interlaced at regular intervals to provide a signal component when the rigid member is oscillated. This signal component has a frequency independent of the angular position of the plate. At a receiver, the two signal components are filtered out. The ratio of the frequencies is extracted to indicate the angular position of the plate independent of variation in the amplitude and frequency of oscillation of the rigid member.

DESCRIPTION OF THE FIGURES

FIG. 1 is a block diagram of a meter reading system which may employ the teaching of this invention;

FIG. 2 is a side elevation view of a shaft position to frequency transducer incorporating features of this invention;

FIG. 3 is a prospective view showing details of a plate included in the transducer of FIG. 2;

FIG. 4 is a front elevation view of an alternate plate which may be employed in a transducer built in accordance with this invention; and FIG. 5 is a circuit block diagram of equipment which may be part of a receiver located at a remote station when a transducer including the plate shown in FIG. 4 is utilized.

DETAILED DESCRIPTION

Referring now to FIG. 1, we see a block diagram showing a simple system for remotely reading a utility meter. A meter station 10 is connected via a transmission medium 11 to a remote station 12. The meter station 10 includes a utility meter modified to send an electrical signal indicative of the meter reading to the remote station 12 in response to a reading request signal. The remote station 12 may include equipment for generating the reading request signal. A receiver may also be included at the remote station 12 which derives information from the meter reading indicative signal. In a more complex system, a computer may be located at the remote station 12 for operating upon and storing the information. It should be apparent that one remote station would be capable of communicating with a large number of meter stations. For example, the remote location might be capable of contacting a plurality of remote stations over a switched telephone network.

A shaft position to frequency transducer 13, see FIG. 2, is located at the meter station 10 for generating and sending the meter reading indication signal in response to the reading request signal. The transducer 13 includes a plate 14 mounted for rotation on a utility meter pointer shaft 16. The plate 14, see FIG. 3, has a reflective surface 17. A pattern of nonreflective radial line segments 18 are drawn on the reflective surface 17. The radial line segments start from a reference angular position and have a continuously increasing angular spacing extending along a circumferential path. In this way different spacings are made indicative of different meter readings. The spacing between the radial line segments has been greatly exaggerated in the drawing for ease of observing. In practice the lines would be so fine and the space so small that they would be difficult to distinguish with the naked eye.

A rigid member 19 including light pipes 21 and 22 is supported by a bracket 23. The right-hand portion of the rigid member 19 provides a cantilevered portion 24 ending adjacent a segment of the circumferential path on plate 14. A light source 26 for controllably illuminating a segment of the path is mounted adjacent a light transmitting surface 27 terminating the light pipe 21. A photoresponsive device 28 for sensing light reflected from the segment of the path is mounted adjacent a light transmitting surface 29 terminating the light pipe 22. The right-hand end of the light pipe 22 terminates in a light transmitting surface 30. It is important that the light transmitting surface 30 is no larger than the width of the radial line segments or the smallest spacing therebetween. If the light transmitting surface 30 were larger, it could not be adjacent only a single line segment or space at a single time so that distinct signals would not appear at the output of the photoresponsive device 28.

A band of magnetic material 31 circumscribes a portion of the cantilevered portion 24. Two electromagnets 32 and 33 are mounted on oppositely disposed sides of the cantilevered portion 24 adjacent the band of magnetic material 31 to oscillate the cantilevered portion in response to the reading request signal. The rigid member 19 itself might be constructed from a magnetic material eliminating the necessity of the band of magnetic material 31.

A signal source 34 provides a sinusoidal voltage between terminals 36 and 37 in response to the reading request signal being applied to an input terminal 38. Electromagnets 32 and 33 are connected in series with each other by a lead 39 and in series with light source 26 by a lead 41 forming a series circuit. Leads 42 and 43 connect the series circuit across terminals 36 and 37.

When the reading request signal is sent from the remote station 12, the signal source 34 energies light source 26 illuminating the portion of the path on plate 14 adjacent the right-hand end of the light pipe 21. The sinusoidal current also flows in the electromagnets 32 and 33 causing the rigid member 19 to vibrate. The amplitude and frequency of the vibration is determined by (1) the mechanical resonant frequency of the cantilevered portion 24, (2) the amplitude and frequency of the current applied to the electromagnets 32 and 33, and (3) the Q of the resonant structure including cantilevered member 24.

As the cantilevered portion 24 vibrates, the light from source 26 scans a portion of the path on the surface 17 including a large number of the closely spaced radial line segments. When the light transmitting surface 30 on the light pipe 22 is adjacent a reflective area, light from the source 26 is guided by light pipe 22 to energize the photoresponsive device 28. When the light transmitting surface 30 on light pipe 22 is adjacent a nonreflective portion of surface 17, no light is transmitted to photoresponsive device 28. In this way, a squarewave signal is developed at an output 44 of the photoresponsive device. This squarewave has a fundamental frequency dependent upon the spacing of the nonreflective portions on the surface 17 adjacent the cantilevered portion 24 and the speed at which the cantilevered portion 24 vibrates. The fundamental frequency signal can be filtered out by known techniques. The amplitude of vibration should be great enough so that a plurality of radial line segments are traversed so that significant signals are not generated each time the cantilevered portion 24 changes direction.

The plate 14, mounted on meter pointer shaft 16 rotates so slowly compared to the frequency of vibration, that it appears to be stationary with respect to that vibration. Since the spacing of the nonreflective radial line segments is indicative of particular meter readings, it is seen that the signal provided at the output 44 of the photoresponsive device 28 has a fundamental frequency indicative of the particular meter readings. This signal is filtered and applied, by means not shown, to the transmission medium 11 for transmission back to remote station 12.

It has been found that to minimize the effect upon the output signal of drive current and frequency variations and still drive the cantilevered portion 24 with small signal power, the Q for the cantilevered resonant system should be between 50 and 100.

While, in the embodiment described, the alternating reflective and nonreflective portions of the surface 17 have varied along a circumferential path, it should be apparent that a spacing gradient could be achieved in a radial direction. The disc 14 would rotate as it does in the present embodiment while the cantilevered portion would be vibrated along a fixed radial position. The reflective and nonreflective surfaces might also be transparent and opaque. In such a case, the photocell or the light source could be mounted to the right-hand side of the disc 14.

In a further embodiment, see FIG. 4, system errors due to vibration amplitude and frequency variations are minimized. A plate 46 is substituted in FIG. 2 for the plate 14. A pattern of radial line segments 47 are drawn on a reflective surface 48. These markings 47 can be looked upon as two interspersed sets of markings. One set is identical to the markings 18 and the other set is equally spaced. The markings of equal spacings are about ten times as close together as the closest markings in the set identical to the markings 18.

The multifrequency signal at the output 44 of the photoresponsive device 28 now has two identifiable frequency components separated by at least a decade. The one due to the uneven markings indicates the angular position of the shaft 16 as well as the amplitude and frequency of vibration of the cantilevered portion 24. The one due to the even markings indicates the amplitude and frequency of vibration of the cantilevered portion 24 only. This effect of interleaved markings can also be achieved with two plates mounted one behind the other.

When the plate 46 is used, the circuit shown in FIG. 5 is employed at the remote station 12. A pair of filters 49 and 51 separate the two identifiable frequency components. A ratiometer 52 takes the ratio of two frequencies to provide a signal indicative of the position of the shaft 16 relatively unaffected by the amplitude and frequency of variation.

It is to be understood that the embodiments described herein are merely illustrative of the principles of the invention. Various modifications may be made thereto by persons skilled in the art without departing from the spirit and scope of the invention.

What is claimed is:

1. A transducer for providing a signal indicative of a meter pointer shaft position including:
    a disc having coded areas of first and second optical characteristics along a path, said disc being mounted for rotation with said shaft;
    a rigid means including a first light pipe; said first light pipe having first and second light transmitting surfaces;
    a light source for illuminating said disc; and
    a photoresponsive device mounted adjacent said first light transmitting surface of said light pipe;
characterized by:
    means for mounting said rigid means for oscillatory motion with said second light transmitting surface of said light pipe adjacent said path.

2. The transducer as defined in claim 1 also including:
    a second light pipe included in said rigid means; said second light pipe having first and second light transmitting surfaces; said second light pipe being arranged with said first light transmitting surface thereof adjacent said second light transmitting surface of said first light pipe; and
    means for mounting said light source adjacent said second light transmitting surface of said second light pipe.

3. The transducer as defined in claim 1 in which said mounting means holds said rigid means to form a cantilevered portion adjacent said path.

4. The transducer as defined in claim 3 also including:
    magnetic material integral to said cantilevered portion of said rigid means; and
    an electromagnet mounted adjacent to said cantilevered portion of said rigid means.

5. The combination as defined in claim 4 also including:
    an A-C signal source responsive to a reading request signal for providing an A-C voltage waveform; and means for applying said A-C voltage waveform to said electromagnet.

6. The transducer as defined in claim 1 in which said coded areas of first optical characteristics include two sets of areas; said first set being equally spaced and said second set being unequally spaced.

7. The transducer as defined in claim 6 in combination with:
a transmission medium having first and second ports; means for applying signals from said photoresponsive device to said first port of said transmission medium; a remote station connected to said second port of said transmission medium; said remote station including: a pair of filters each having an input and an output terminal; means for connecting said input terminals together; means for applying said signals to said input terminals, a ratiometer having first and second input terminals and an output terminal; and means for connecting the output terminals of said first and second filters to the first and second input terminals, respectively of said ratiometer.

References Cited

UNITED STATES PATENTS 3,044,349    7/1962    Watrous    356—45

RAYMOND F. HOSSFELD, Primary Examiner

U.S. Cl. X.R.

350—96